United States Patent
Kilaparti et al.

[19]

[11] Patent Number: 5,886,845
[45] Date of Patent: Mar. 23, 1999

[54] TAPE PACK SHIFT DETECTION AND RETENSIONING METHODS AND DRIVE APPARATUS REGARDING SAME

[75] Inventors: Sarveswara R. Kilaparti, Stillwater; Gary D. Moeller, Maplewood, both of Minn.

[73] Assignee: Imation Corp., Oakdale, Minn.

[21] Appl. No.: 689,670

[22] Filed: Aug. 13, 1996

[51] Int. Cl.$^6$ .................................................. G11B 15/43
[52] U.S. Cl. ............................................ 360/69; 360/74.3
[58] Field of Search .............................. 360/69, 74.3, 85, 360/60; 242/33.4

[56] References Cited

U.S. PATENT DOCUMENTS

| | | | |
|---|---|---|---|
| 4,054,923 | 10/1977 | Lewis | 360/60 |
| 4,639,796 | 1/1987 | Solhjell | 360/77 |
| 4,786,984 | 11/1988 | Seeman | 360/31 |
| 5,216,556 | 6/1993 | Steinberg et al. | 360/74.3 |
| 5,264,972 | 11/1993 | Soljell | 360/73.04 |
| 5,287,225 | 2/1994 | Sukigara | 360/31 |
| 5,377,057 | 12/1994 | Solhjell | 360/75 |
| 5,379,165 | 1/1995 | Pahr | 360/78.02 |
| 5,448,430 | 9/1995 | Bailey et al. | |
| 5,450,257 | 9/1995 | Tran et al. | 36/76 |
| 5,572,378 | 11/1996 | Schwarz et al. | 360/74.3 X |
| 5,583,711 | 12/1996 | Ohkubo et al. | 360/74.3 |

FOREIGN PATENT DOCUMENTS

| | | |
|---|---|---|
| 0537410 A2 | 4/1993 | European Pat. Off. . |
| 0630000 | 12/1994 | European Pat. Off. . |
| 63-191350 | 8/1988 | Japan . |

*Primary Examiner*—Aristotelis M. Psitos
*Assistant Examiner*—K. Wong
*Attorney, Agent, or Firm*—Eric D. Levinson

[57] ABSTRACT

A method of retensioning a tape pack in a two-hub, belt-driven data cartridge, wherein the tape pack includes tape having one or more tracks, includes sensing at least one position of a track of the tape within the data cartridge and then conditionally retensioning the tape pack as a function of the at least one sensed track position. The retensioning may be determined by comparing the sensed position of the track to at least one predetermined limit; the predetermined limit being based on statistical data. A drive apparatus for performing the retensioning method is also described.

31 Claims, 6 Drawing Sheets

TAPE PACK SHIFT DETECTION AND RETENSIONING METHODS AND DRIVE APPARATUS REGARDING SAME

FIELD OF INVENTION

The present invention relates to tape drives and data cartridges. More particularly, the present invention relates to the detection of tape pack shift in data cartridges and the retensioning of the tape packs therein.

BACKGROUND OF THE INVENTION

Many types of data cartridges exist, such as the two-hub, belt-driven magnetic tape data cartridge as shown in FIG. 1. The typical data cartridge has a housing which encloses a pair of rotatably mounted tape hubs about which tape is wound. In the course of passing the tape from one hub to the other, the tape passes along a predefined tape path in the data cartridge which moves the tape past a cut away portion through which a head of a drive can access the tape. The data cartridge housing also typically encloses various rollers, such as, for example, corner rollers and a drive roller. A drive belt is stretched around the rollers, including the drive roller, and the tape packs on the hubs. The drive roller is contacted by a drive mechanism of a tape drive through an opening formed at the front of the housing. Under control of a processing unit of the tape drive, movement of the drive roller by the drive mechanism causes the drive belt to move and frictional engagement between the drive belt and the tape then causes the tape to move. In addition to moving the tape, the drive belt also provides for tension in the tape. The tape can be moved and read in either direction, i.e., either hub can serve as the supply or as the take-up hub depending on the direction of the movement of the tape.

Tape is wound into the data cartridge resulting in a tape pack with a certain tape and belt tension. These tensions generate forces in the tape pack to alleviate tape pack shift and problems that may result therefrom. However, when a data cartridge is subjected to temperature changes, the forces holding the tape in position in the tape pack change. These forces may go below a certain level at some position of the tape pack causing the pack to shift. In other words, at least a portion of the tape wound within the tape pack loses tape tension and either shifts towards, for example, the cover or the base plate of a data cartridge.

There are numerous environmental circumstances that may lead to such tape pack shift. For example, a mechanical shock to the data cartridge may produce tape pack shift, as well as the above mentioned temperature changes.

Further, short shuffling of the tape, i.e., operation or movement of the tape from one hub toward the other hub repetitively for less than the full length of the tape, may also result in tape pack shift or changes in the forces that hold the tape in place. In other words, when the tape is moved from the beginning of the tape (BOT) towards the end of the tape (EOT) without going all the way to the EOT, a point of turn around occurs somewhere between the BOT and EOT. At the point of turn around, the pack may lose tension causing tape pack shift.

Various degrees of tape pack shift may occur. For example, the amount of shift due to short shuffling over a short period of time may be much less than the shift due to exposure of the cartridge to an extreme temperature change. In some circumstances, if a shifted tape pack is subjected to sudden acceleration or deceleration, tape pack scramble may occur, i.e., the tape may lose its normal wound position or its position on the guide pins causing catastrophic failure of the data cartridge.

Conventionally, tape pack shift is removed by retensioning of the tape, i.e., tape pass from BOT to EOT and back to BOT, each time a data cartridge is inserted into a tape drive (which may hereinafter be referred to as automatic retensioning). For example, if such data cartridges are utilized for operation in a library system, each time the data cartridge is inserted into the tape drive, the tape pack of the data cartridge must be retensioned. This may require a time period of more than four minutes every time the tape is retensioned. Such time delays for a user attempting to access information on the data cartridge is undesirable.

For the above reasons and other reasons that will become apparent from the description below, alternatives to conventional retensioning of tape packs to avoid failures of tape pack shifted data cartridges are needed. For example, any such alternative must overcome the need to retension the tape pack of a data cartridge at every insertion into the tape drive.

SUMMARY OF THE INVENTION

The present invention solves the problems described above by detecting tape pack shift as a function of the position of a track of the tape within the data cartridge. Further, the present invention conditionally retensions the tape pack of a data cartridge as a function of the detected pack shift. That is, as opposed to automatically retensioning a tape pack of the data cartridge each time the data cartridge is inserted into a tape drive, the problems of tape pack shift are reduced in accordance with the present invention by conditionally retensioning the tape pack of a data cartridge as a function of the position of a track of the tape.

A method of detecting tape pack shift in a two-hub, belt-driven data cartridge in accordance with the present invention includes providing a two-hub, belt-driven data cartridge including a tape pack of tape having one or more tracks. Tape pack shift is then detected as a function of at least one position of a track within the data cartridge.

A method of retensioning a tape pack in a two-hub, belt-driven data cartridge is also described. The tape pack includes tape having one or more tracks. The method includes sensing at least one position of a track of the tape within the data cartridge and then retensioning the tape pack as a function of the at least one sensed track position.

In other embodiments of the retensioning method, the sensing step may include sensing the position of a servo track or the sensing step may include sensing the position of a data track.

In another embodiment of the retensioning method, the retensioning step includes the comparison of a sensed position of the track to at least one predetermined limit and the retensioning of the tape pack is then based on the comparison. Further, the predetermined limit may be based on data representative of variation in the position of the track of a plurality of data cartridges before being subjected to pack shifting conditions. Yet further, the predetermined limit may also be based on data representative of the position of the track after the plurality of data cartridges are subjected to pack shifting conditions.

In yet another embodiment of the retensioning method, the sensing step is performed during an initial loading period. In the initial loading period, the tape moves towards the end of the tape from a parked position. The retensioning of the tape pack is performed as a function of the sensed position without return to the parked position.

In a further embodiment, the sensing step may include sensing a first position of the track at a first portion of the tape and a second position of the track at a second portion of the tape. Further, the retensioning step may include retensioning the tape pack as a function of the difference between the first and second positions or retensioning the tape pack as a function of the slope of the track determined as a function of the first and second position.

An apparatus for retensioning a tape pack of a two-hub, belt-driven data cartridge is also described. The tape pack includes tape having one or more tracks. The apparatus includes a head assembly for sensing at least one position of a track of the tape within the data cartridge and for generating at least one position signal as a function of the position of the track. The apparatus further includes a controller for receiving the at least one position signal and initiating retensioning of the tape pack as a function of the at least one position signal and at least one predetermined limit.

In one embodiment of the apparatus, the head assembly includes a head and an actuator for adjusting the position of the head. The head assembly generates a position signal based on the state of the actuator. The controller initiates retensioning of the tape pack as a function of the position signal and the at least one predetermined limit.

In another embodiment of the apparatus, the head assembly senses a first position of the track at a first portion of the tape and a second position of the track at a second portion of the tape. The controller determines slope of the track as a function of the first and second position and initiates retensioning of the tape pack as a function of the slope and at least one predetermined slope limit.

In yet another embodiment, the head assembly senses a first position of the track at a first portion of the tape as the tape is moved in a first direction and senses a second position of the track at a second portion of the tape as the tape is moved in a direction opposite the first direction. The controller retensions the tape pack as a function of a difference between the first and second position and the at least one predetermined limit.

DETAILED DESCRIPTION OF THE EMBODIMENTS

Figure 1:
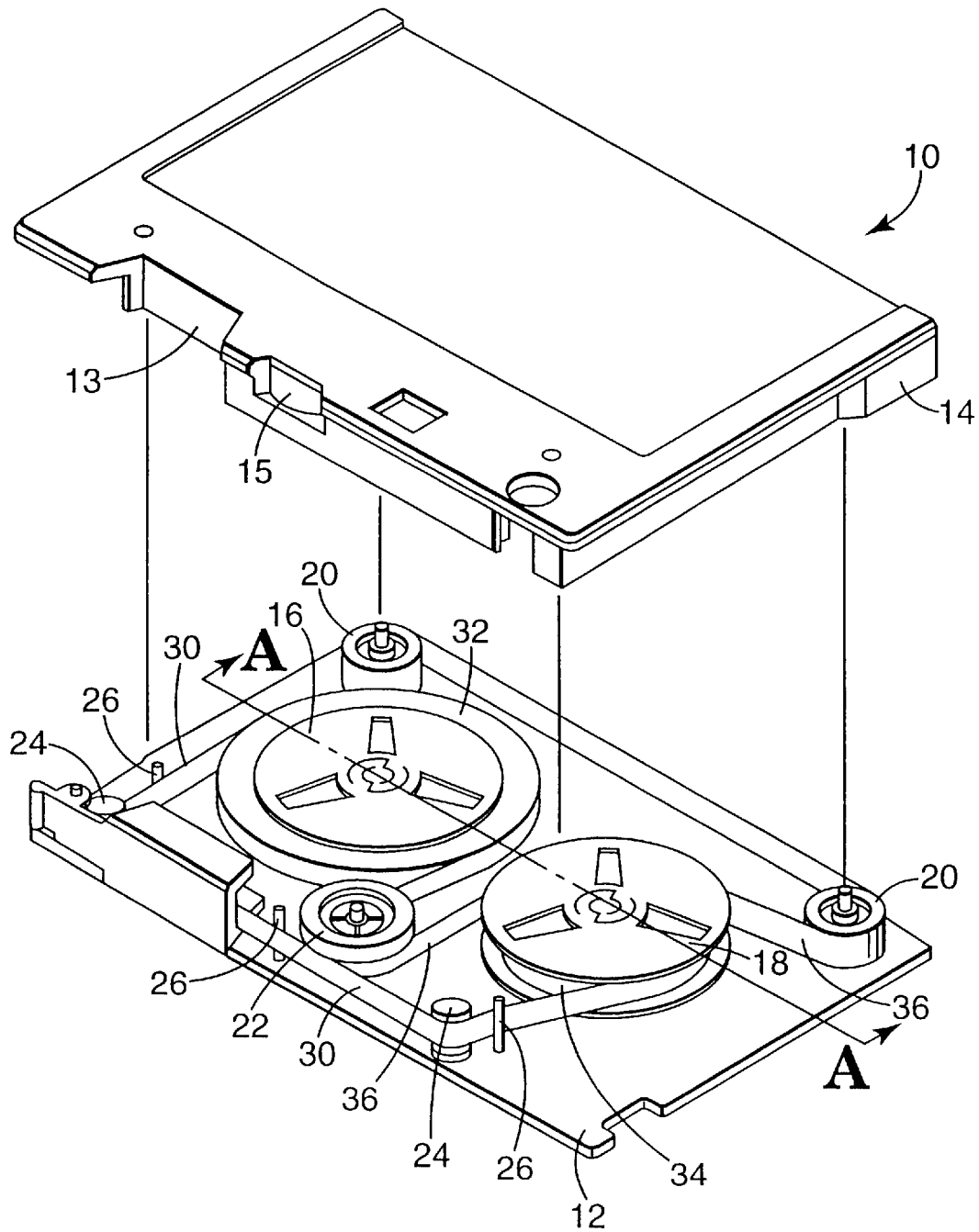
FIG. 1 is a partially exploded perspective view showing construction of a two-hub, belt-driven tape cartridge.

The present invention shall be described with reference to FIGS. 1–6. A two-hub, belt-driven data cartridge 10 illustrative of a typical data cartridge with which the present invention is utilized, and for which the present invention is beneficial, is shown in FIG. 1. The data cartridge 10 includes a base plate 12 and cover 14 which form a housing to enclose a pair of rotatably mounted tape hubs, hub 16 and hub 18. Tape 30 is wound about the hubs 16 and 18 forming tape packs 32 and 34, respectively. The tape 30 is fed in a predetermined tape path past a media access opening 13 for access by a drive head (FIG. 5). The tape path is at least in part established by tape guide pins 24 and, in some data cartridges, wrap pins 26. A drive belt 36 is mounted around a drive roller 22, the tape packs 32 and 34, and around the corner rollers 20. The drive roller 22 is accessible by a drive mechanism, i.e., drive puck, (FIG. 5) of a tape drive through an opening 15 formed at the front of the cover 14. Movement of the drive roller 22 by the drive mechanism under control of a processing unit of the tape drive causes the drive belt 36 to move, and frictional engagement between the drive belt 36 and the tape 30 causes the tape 30 to move from one hub to the other, i.e., the supply hub to the take-up hub. It should be readily apparent to one skilled in the art that either hub can serve as the supply hub or take-up hub depending on the direction and movement of the tape.

Figure 2:
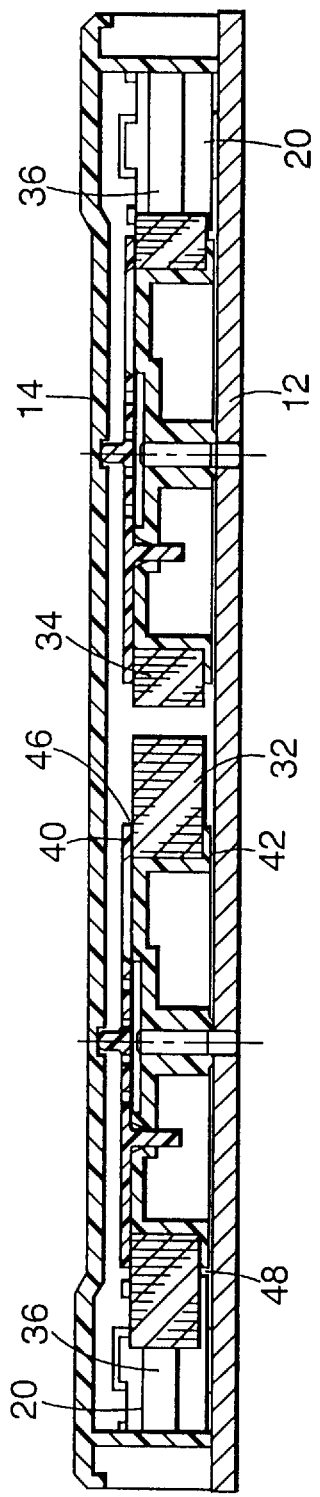
FIG. 2 is a sectional view along line A—A of the tape cartridge of FIG. 1.

FIG. 2 is a sectional view of the data cartridge 10 of FIG. 1. The tape packs 32 and 34 shown therein may undergo tape pack shift for various reasons as described in the Background of the Invention section herein. As shown in FIG. 2, the hub 16 includes upper hub member or flange 40 and lower hub member or flange 42. The tape pack 32 is wound such that at least a portion of the tape pack 32 extends beyond the edge of the upper and lower hub flanges 40, 42. Due to various conditions, such as, for example, mechanical shock, temperature changes, and shuffling, tape pack shift of various degrees may occur. For example, the tape pack 32 may be shifted such that portions of the tape 30 may move into gap 48 towards the base plate 12 or move into gap 46 towards the cover 14. The same is true with respect to tape pack 34. Typically, at the time the data cartridge is inserted into a tape drive, the tape is wound substantially entirely about the supply hub. Therefore, typically, tape pack shift would occur primarily with respect to the tape pack wound on the supply hub. However, the present invention is contemplated for use with data cartridges that are not normally parked at the BOT. For example, the tape packs may be parked prior to insertion into a drive unit at a central location of the tape or anywhere between the BOT and EOT such that access time to information may be reduced. Therefore, the present invention contemplates performing the retensioning method based on position sensing of the track anywhere from the BOT to EOT and movement of the tape for sensing the position may occur in either direction when the tape is parked somewhere between the BOT and EOT as opposed to being parked at BOT.

Figure 3:
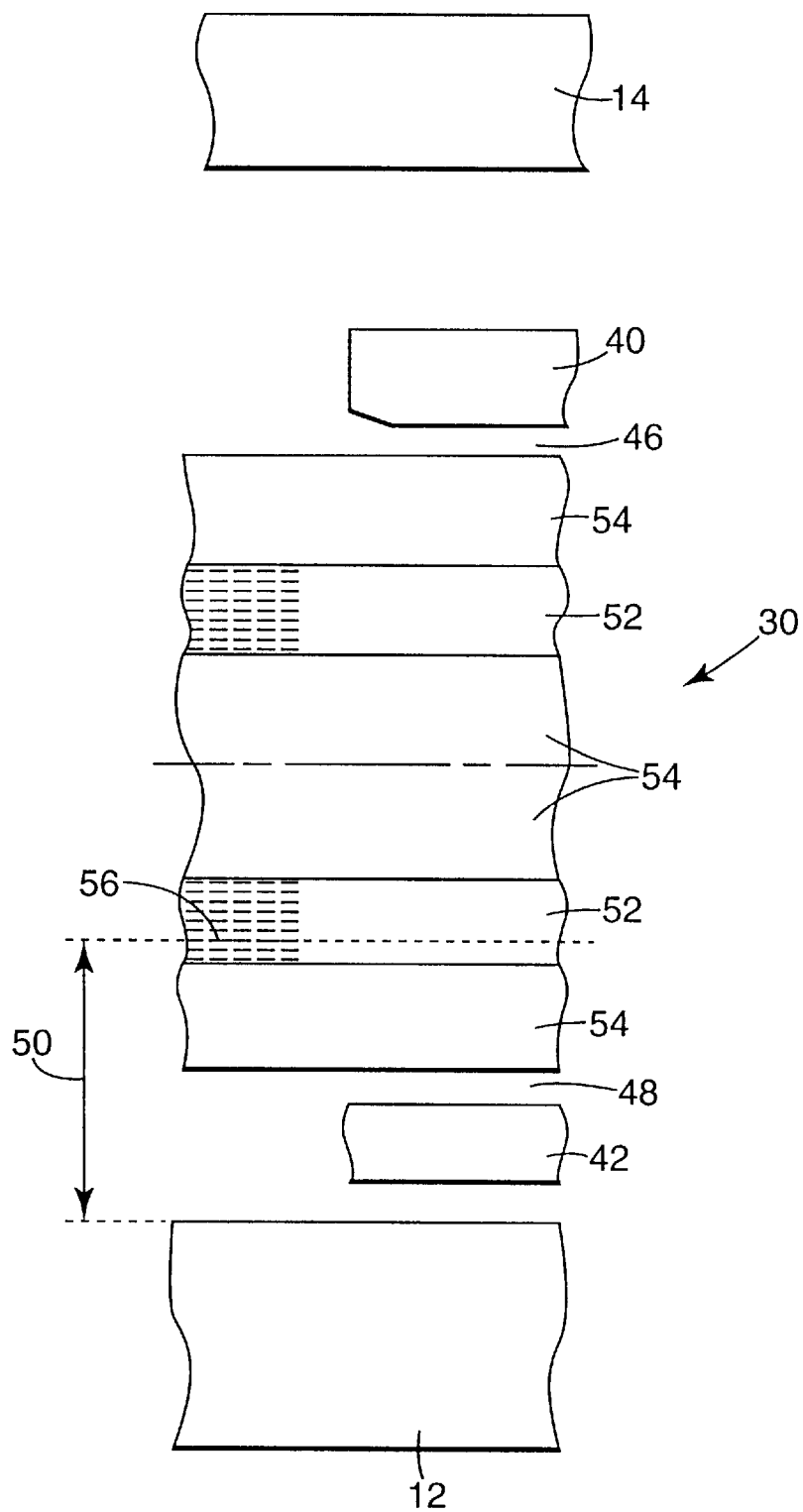
FIG. 3 is a detailed illustrative view of a portion of the data cartridge of FIG. 1 and 2.

A normal data cartridge which has not been subjected to pack shifting conditions, presents a track on the tape such as track 56, as shown in FIG. 3, to the head of a drive at a particular distance 50, within tolerances, with respect to the base plate 12 of the data cartridge 10. This track position, i.e., distance 50, varies with the manufacturing process capability for producing the data cartridges. For example, such manufacturing processes for the components, including the tape guides 24, all give rise to variations in the position of the track 56 within the data cartridge. For example, tape placement relative to the guide, i.e., tape to guide variation as defined by the width of the guide minus the tape width; placement of the track on the tape; and variation of the position of the guide, such as the shoulder of a guide relative to the base plate of the data cartridge, all vary the track position within the data cartridge.

A data cartridge with a shifted tape pack presents a track to the head of the tape drive with a track position that is at a different level compared to the same track of a normal data cartridge, i.e., a data cartridge that has not been subjected to conditions that may cause tape pack shift. Tape packs that have not been subjected to such pack shifting conditions are nominally at the same level in the tape guides from one data cartridge to another data cartridge of the same type.

On the other hand, a shifted tape pack is positioned at a different level on the tape guides. Therefore, a track's position within the data cartridge, and therefore, with respect to the base plate of a data cartridge, is different for pack shifted data cartridges compared to normal data cartridges that have not been subjected to pack shifting conditions. These track position differences between pack shifted tape packs and tape packs that have not been subjected to pack shifting conditions are utilized to set predetermined limits for pack shift detection and conditional retensioning as further described below with reference to FIGS. 4–6. This relationship between shifted tape pack data cartridges and those cartridges that have not been subjected to pack shifting conditions will be further described below in detail which reference to FIG. 6.

The data cartridge 10 as shown in FIGS. 1–3 is given for illustration purposes only. Various configurations for data cartridges are known to those skilled in the art. The present invention is applicable to any two-hub, belt-driven data cartridge where tape pack shift is a possibility. For example, data cartridges may include any known configuration for the cover and base plate, may include additional corner rollers, additional tape guide pins, additional wrap pins, and any other known modifications that would be apparent to one skilled in the art.

The tape 30 of the data cartridge 10, as shown in the detail illustrative view of FIG. 3, includes four regions of data tracks 54, and two regions of servo tracks 52. However, the present invention is in no manner limited to any particular tape configuration. For example, the tape may be of any width, i.e., ¼ inch tape, 8 mm tape, etc. Further, the tape may include any number of data tracks and servo tracks, and the data tracks and servo tracks may be grouped in any manner and constructed in any fashion. Further, the present invention is not limited to tape including one or more servo tracks for utilization in a closed loop system, but rather may be tape for a data cartridge for use in an open loop system. Therefore, any tape having one or more tracks, whether servo, data, or any other type of track utilized in data cartridges is contemplated in accordance with the present invention.

For purposes of this invention, a servo track may be any track containing a pattern from which a positioning signal may be derived. Further, for purposes of the present invention, an edge of the tape may be considered a track because the position of the edge of the tape within the data cartridge may be detected and suitable for defining tape pack shift as well as any other data track, servo track, or auxiliary track.

Further, the present invention is particularly described with reference to magnetic tape, such as a tape consisting of a flexible base material typically coated on one side with a magnetizable layer. However, the tape may include magnetic tape or any other type of tape that can be written to or read from in a variety of other manners. For example, the tracks of the tape may include data written for access by optical devices, i.e., may include tracks (servo, data, etc.) including information written with certain reflective characteristics as opposed to magnetic characteristics. Further, for example, the tape may include information written thereto and extractable therefrom by utilizing any tape characteristic, i.e., mechanical deformation, electrical characteristics, etc. Therefore, it should be readily apparent to one skilled in the art that the tape 30 described and shown in FIG. 3 is also for illustrative purposes only. It is only necessary that the tape 30 have a track capable of being locked onto by the head of a tape drive utilized so that the position of the track within the data cartridge can be detected.

Figure 4:
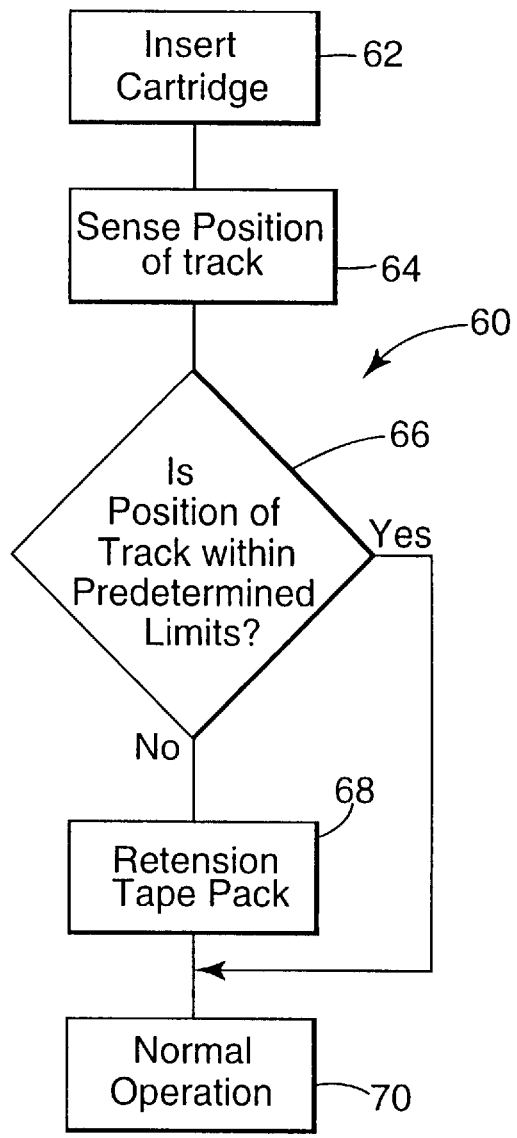
FIG. 4 is a flow chart showing the pack shift detection and retensioning method in accordance with the present invention.
Figure 5:
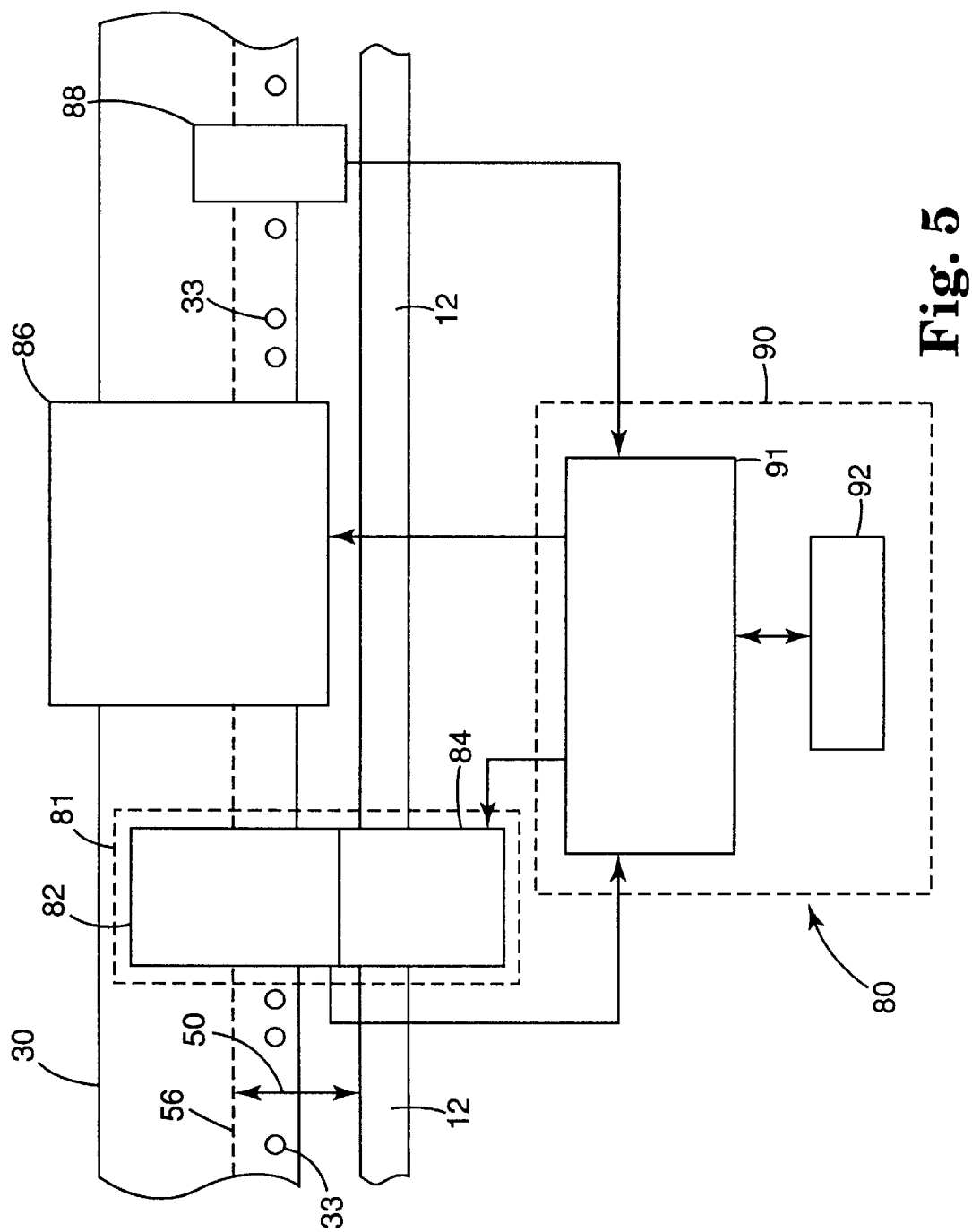
FIG. 5 is an illustrative view of a drive apparatus for carrying out the method of FIG. 4.

The pack shift detection and retensioning method 60 and the drive apparatus 80 for performing the method shall be described with particular reference to FIGS. 4 and 5. The description of the method shall also make reference to the magnetic tape data cartridge 10 shown illustratively as data cartridge 10 in FIGS. 1–3. Although the data cartridge 10 includes tape 30 having a plurality of tracks including at least one servo track for operation in a closed loop drive system, an open loop system also benefits from present invention and the track sensed is not limited to the position sensing of a servo track, but may be any data track, auxiliary track, etc.

The detection and retensioning method 60 in accordance with the present invention is shown in the flow diagram of FIG. 4. After insertion of a data cartridge (block 62) into a drive apparatus, the position of a track of the tape 30 within the data cartridge 10 is sensed or detected (block 64) as the tape moves from BOT (or any other parked position). For example, the position of the track may be sensed relative to the base plate 12 of the data cartridge 10 as shown by the distance 50 in FIG. 3. However, the track may be sensed with respect to any point of the data cartridge or the drive apparatus in which the data cartridge 10 is inserted. It should be apparent to one skilled in the art that the sensed position may be represented in a number of manners. For example, the state of an actuator, i.e., a stepper motor or voice coil, or any other course and/or fine adjustment devices, may be used to indicate position of the track within the data cartridge.

In an additional configuration, the position of the track may be any other positional characteristic of the track, such as slope. For example, the slope of the track may be sensed by generating two position signals representative of the position of the track at two positions on the tape at a known distance from one another. Such signals may be generated with the use of two heads, multiple transducer elements of a head or any other configuration that may generate signals representative of track positions of the track at a known distance with respect to one another. The slope of the track can then be compared to at least one predetermined slope limits established in a similar manner as described below to determine if retensioning is necessary.

In another configuration, more than one sensed position of the track could be sensed and used to indicate tape pack shift in another manner. For example, a first position of a track may be sensed as the tape is moving in a first direction, i.e., such as from a central parked positioned. Thereafter, the tape can be reversed to move opposite the first direction and a second position can be sensed for the track after a head has locked thereon. The difference between these two positions of the track are compared to predetermined limits established in a similar manner as described below to determine if retensioning is necessary.

After the track position or positions are sensed, the position (or a slope or difference value generated from the positions sensed) is compared to predetermined limit(s) to determine if retensioning is required (block 66). If the track position is within the predetermined limits, i.e., limits based on statistical data of the position of the track for a plurality of normal data cartridges which have not been subject to pack shifting conditions, then the tape pack does not need to be retensioned. Normal read and/or write operation is then carried out in accordance with user direction (block 70). As described further below, the predetermined limits may also be further based on track positions of the track sensed after the data cartridges have been subjected to pack shifting conditions.

However, if the track position (or slope or difference value) being sensed is not within the predetermined limits, then the tape pack is retensioned (block 68). The tape pack 32 does not return to the BOT (or other parked position) to start the retensioning process. Rather, when it is determined that retensioning is to be performed, the tape passes from the point at which the retensioning determination was made to EOT and back to BOT. As such, the tape does not return to the BOT prior to performing the retensioning process. By proceeding with the retensioning process at the point of the retensioning determination based on the sensed track position, the chance of scrambling the data cartridge 10, by returning to the BOT prior to retensioning the tape pack, is reduced. After the tape pack of the data cartridge has been retensioned and the cartridge is at BOT, normal read and/or write operation may proceed (block 70).

In the configuration wherein more than one position of the track is sensed and a difference value generated for comparison to the predetermined limits, because the tape is moved in an opposite direction to obtain the second position value, the retensioning determination is not made prior to return to the parked position. However, the distance necessary to lock onto the track prior to return to the parked position can be performed in a short distance and possibly at a slower speed to prevent scrambling from occurring before retensioning is performed.

As previously described, the track of the tape to be sensed may include any type of track. For example, the track for which the position is to be sensed may be a data track, a servo track in a closed loop drive system, a data track in an open loop drive system, or any other track such as an auxiliary track used for other functional purposes, including the edge of the tape, previously included in the definition of a track for simplicity purposes.

Figure 6:
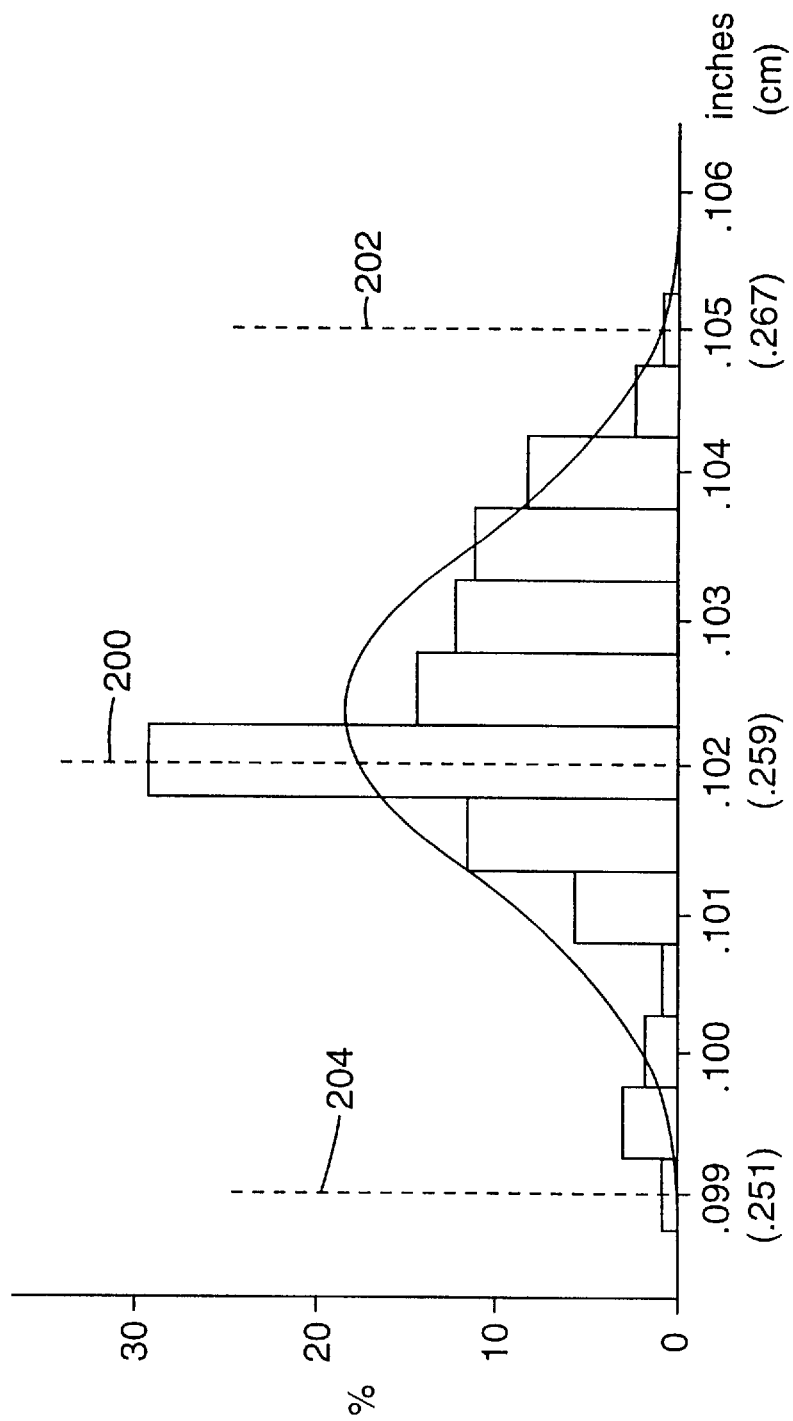
FIG. 6 is a graph showing a distribution of positions of the sensed track of a plurality of data cartridges before such data cartridges are subjected to conditions that may result in tape pack shift.

The predetermined limits utilized in conjunction with the sensed track positions to determine if the tape pack is to be retensioned, are established based on statistical data of track positions for the track to be sensed of a plurality of normal data cartridges not subjected to pack shifting conditions. Predetermined limits for use in comparisons to slope values or difference values determined in accordance with the alternate configurations are established in a similar manner. A distribution of the variation of the position for a particular track of a plurality of such data cartridges is shown in FIG. 6. The mean variation for the position of the track is represented as dashed line 200. The variation in the track positions vary along the distribution due to the production processes and tolerances for the components of the data cartridge. Generally, three different tolerances affect the position of a track within the data cartridge. First, tape placement on the guide pin, i.e., tape to guide variation as defined by the width of the guide minus the tape width, affects the track position. Second, placement tolerance for placement of the track on the tape also varies the track position. Last, the variation in the manufacture of the tape guide pins, such as the tolerance allowed for the shoulder of a guide pin relative to the base plate of the data cartridge, also vary the track position within the data cartridge.

The predetermined limits are selected based on the variation of the track positions possible for data cartridges that have not been subjected to pack shifting conditions, i.e., the variations due to the production processes as generally described above. Upper limit 202 (for example, 0.267 cm (0.105 inches)) and lower limit 204 (for example, 0.251 cm (0.099 inches)) are set such that sensed tracks having a position that falls within the distribution, i.e., positions typical for normal tape packs not subjected to pack shifting conditions, do not result in retensioning of the data cartridge.

When further data is considered, such as track positions for the particular track of the plurality of data cartridges after such data cartridges have been subjected to pack shifting conditions, the upper and lower limits 202 and 204 can be either tightened or loosened depending upon such data. For example, track position data may include track position variations which fall outside of the normal distribution, i.e., indicating tape pack shift for data cartridges. However, if the degree of pack shift does not cause data cartridges to fail upon operation, then the limits may be loosened such that a greater number of data cartridges need not be retensioned. Likewise, limits may be tightened if data cartridges have sensed track positions that fall within the distribution, yet still lead to failure. In such a case, retensioning of a greater number of data cartridges may be necessary.

Particularly, the, graph of FIG. 6 shows track positions for a plurality of data cartridges available under the trade designation of 13 GB Data Cartridge (a ¼ inch magnetic tape cartridge) from Imation Corp., Oakdale, Minn. The mean variation 200 of the track position for the bottom track of the lower servo band of one-hundred and eight (108) such data cartridges is shown to be about 0.259 cm (0.102 inches). The track position variations within the distribution are translated from stepper motor states after the head of a drive is locked onto the bottom track of the lower servo band of the cartridges. The data generally indicates that if the position of the bottom track of the lower servo band of such data cartridges is within about 0.008 cm (0.003 inches) of the mean variation, i.e., about 0.259 cm (0.102 inches), that retensioning is not necessary for such data cartridges as these position variations generally are a result of the process tolerances previously described. Therefore, upper and lower limits 202, 204 can be set at about 0.008 cm (0.003 inches) from the mean variation 200 for the detection and retensioning method 60 for the 13 GB Data Cartridge. Further, these limits can be modified, i.e., loosened or tightened, depending upon data indicating whether tape pack shift detected after such data cartridges are subjected to pack shifting conditions, i.e., a track position variation outside of the normal distribution of track positions, leads to data cartridge failures.

As would be readily apparent to one skilled in the art, predetermined limits may be established for any tape configuration and is not limited to the ¼ inch magnetic tape described above. For example, the limits may be established for 8 mm tape.

The drive apparatus 80 for carrying out the tape pack shift detection and retensioning method 60 is shown in the illustrative block diagram view of FIG. 5. The drive apparatus 80 includes a head assembly 81. The head assembly 81 includes a head 82 having at least one transducer element. The head 82 is positionable relative to the tape 30 by an actuator 84. The tape is moved across the head 82 under control of processing unit 90 of the drive apparatus 80 utilizing drive mechanism 86 which accesses drive roller 22 of the data cartridge 10 for moving tape 30. The processing unit 90, including processor 91 and associated memory 92, provides for control of the drive apparatus 80. The drive apparatus 80 may also include a hole detector 88 for performance of additional functionality, i.e., cartridge identification, as further described below.

Drive apparatus 80 may be any tape drive capable of sensing the position of a track within the data cartridge, i.e., such as relative to the base plate, and further capable of controlling the retensioning of the data cartridge based on the position of the track. For example, if the track of which the position is being sensed is a track having optically recognizable data written thereto, the drive apparatus 80 will include a drive capable of optically locking onto a track and generating a track position signal to the processing unit 90 for use in the pack shift detection and retensioning method 60. In addition, for example, the magnetic tape drive may be a tape drive available under the trade designation of Tape Stor 8000 available from Seagate (Costa Mesa, Calif.) if the track position to be sensed is a track of the tape of a TR4 Data Cartridge (available from Imation Corp.) or the magnetic tape drive may be any other currently available tape drive for sensing a track position of a particular data cartridge. Such tape drives would be modified to include software, hardware, firmware, or any other manners for performing the conditional retensioning method based on the position or positions of a track sensed as described herein.

The components of the drive apparatus 80 may include any known components capable of carrying out the operation of the method 60 and the present invention is not limited to any particular drive configuration. For example, head 82 of the drive apparatus 80 may include any multitrack head, single track head, hybrid thereof, or any other head suitable for locking onto a track 56 of tape 30 under control of an associated tape drive search algorithm. Further, the head 82 may include a plurality of heads as opposed to a single head. For example, multiple heads could be used to sense the slope of the track. Various algorithms for searching and locking onto tracks are known to those skilled in the art and the present invention is not limited to any particular search algorithm.

Further, the actuator 84, for example, may include a stepper motor mechanically coupled to the head for positioning transducer elements thereof in alignment with tape tracks, and/or may include a voice coil for performing similar functions. There are numerous actuators and mechanical coupling elements that are capable of moving the transducer elements of the head in fine and/or course adjustment in response to control signals from the processing unit 90 in accordance with known tape drive search algorithms and which can be utilized in the present invention.

The processing unit 90 may include any algorithms that are utilized by one skilled in the art for locking onto a particular track on the tape. In addition, the processing unit performs the comparison of the sensed track position, i.e., position signal, with the predetermined limits, for example, stored in memory 92. Such comparison may be performed by converting the position signal, such as, for example, the state of the actuator, to a dimensional value comparable to dimensional values stored in memory, such as, for example, values representative of track position relative to the base plate. It should be readily apparent that the detection and retensioning process may be carried out utilizing hardware or firmware, in addition to or as opposed to software. Any particular software, hardware, or firmware configuration for carrying out the comparison and controlling the initiation of the retensioning process for moving the tape towards the EOT and back to the BOT after the determination that retensioning is to be performed, may be utilized in the present invention.

In other words, a suitable drive apparatus 80 need only include a head assembly 81 controllable by processing unit 90 such that head assembly 81 can lock onto a particular track 56 and provide a position signal representative of the track position within the data cartridge. Such a suitable drive apparatus must then be able to determine if retensioning is necessary based on the position signal and predetermined limits and control the retensioning process accordingly.

An illustrative description of the detection and retensioning method 60 utilizing the drive apparatus 80, configured as a magnetic tape drive apparatus including servo loop control for head-track positioning, is now set forth. However, as previously indicated, one skilled in the art will recognize that the present invention is not limited to servo loop controlled drive systems. Rather, the present invention is limited only in accordance with the accompanying claims.

When tape cartridge 10 is inserted into the drive apparatus 80, the base plate 12 of the cartridge is seated within the drive apparatus 80 to restrain motion of the data cartridge 10. Under control of the processing unit 90, the magnetic tape 30 is moved from the BOT and the drive apparatus 80 proceeds through a data cartridge loading sequence to identify the cartridge, i.e., whether the cartridge is a 13 gigabyte cartridge, a 2.5 gigabyte cartridge, etc., and further, to check one or more servo track positions to ensure that the data cartridge is presenting the tape within a particular tolerance adequate for writing and/or reading operations.

For example, in the loading sequence, the tape moves forward a short distance so as to determine the identity of the cartridge. The identity is checked, for example, by a hole detector 88 which senses the hole pattern of holes 33 on the magnetic tape 30. Although a hole detector 88 is described herein, any identification sequence and any detection device may be utilized to determine and signal the processor as to the identity of the data cartridge inserted in the drive apparatus 80. After the identity of the data cartridge 10 is determined and the processing unit 90 has determined the associated algorithms to utilize with respect to the identified cartridge, the tape is reversed to the BOT.

Generally, turn around at some point before EOT of a pack shifted tape, i.e., short shuffle, may cause scrambling to occur or failure of the cartridge. However, only a short distance of tape is required to identify the cartridge. Therefore, turn around to BOT after an identification process before the possibility of detecting tape shift and determining whether retensioning is necessary, typically does not lead to damage of the cartridge.

Upon completion of moving the tape to BOT, the tape 30 is once again moved from BOT towards EOT and a servo track, such as servo track 56, is located and locked onto to ensure that the data cartridge 10 and tape therein is presented to the head within certain tolerances for writing and/or reading operations. For example, the tape may be moved forward from the BOT at a somewhat higher speed than used for cartridge identification. A servo track position signal is generated by the head assembly 81. If the servo track position signal is within a certain tolerance allowed by the drive apparatus 80, as determined by processing unit 90, then the drive apparatus is ensured that read and/or write operations can be performed. This same servo track position signal representative of the position of the servo track 56 is also utilized to determined whether the tape pack is to be retensioned or not.

The processing unit 90 controls actuator 84 (which moves head 82) by way of a particular algorithm to search and lock onto the servo track 56. Once the transducer element of the head are locked onto the track 56, the state of the actuator, or signal provided to the actuator for positioning the head, is representative of track position within the data cartridge. For example, a stepper motor may be at a particular position indicative of the position of the track locked onto by the head. This state, i.e. position signal, can be easily compared to the predetermined limits selected based on statistical data for a plurality of like data cartridges, just as it can be used to ensure that proper operations can be performed. For example, using the values from FIG. 6, the upper and lower limits 202, 204 can be set as upper and lower stepper motor states corresponding to the 0.016 cm (0.006 inches) range, i.e., 0.008 cm (0.003 inches) from mean variation for the track position, and the stepper motor state can be easily compared to the stepper motor limits to determine if retensioning is necessary.

If the position of the track, as represented by the track position signal, is within the predetermined limits, i.e., between the upper and lower limits 202, 204, the remainder of the auto load sequence may be performed, such as, for example, sensing the placement of other servo tracks. The tape is then reversed back to the BOT in order to continue normal operation, such as conducting read and/or write operations.

If the position of the track is not within the predetermined limits then retensioning is to be performed. From the point within the tape pack at which the need to retension was determined, the tape is passed to the EOT and back to BOT to retension the tape. In other words, in this conditional retensioning process, the drive apparatus 80 detects the servo track position during the cartridge loading and if the position signal is not within the predetermined limits, the cartridge is retensioned under control of the processing unit 90 without attempting to load the data cartridge 10 any further.

The invention has been described with respect to particular embodiments, but the scope of the invention is not limited thereto. It will be clear to one of skill in the art that the concepts disclosed herein could be combined in various ways, both among the embodiments shown, and with other concepts. Accordingly, the invention is limited only by the scope of the following claims.

What is claimed is:

1. A method of detecting tape pack shift in two-hub, belt-driven data cartridges, the method comprising the steps of:
   providing a two-hub, belt-driven data cartridge including a tape pack of tape having one or more tracks; and
   detecting tape pack shift of the tape pack as a function of at least one position of a servo track within the data cartridge.

2. The method according to claim 1, wherein the detecting step includes sensing a position of the servo track within the data cartridge.

3. The method according to claim 1, wherein the method includes providing at least one predetermined limit, wherein the detecting step includes the step of comparing the position of the servo track to the at least one predetermined limit, and further wherein providing the at least one predetermined limit includes providing the at least one predetermined limit based on data representative of variation in the position of the servo track of a plurality of data cartridges before being subjected to pack shifting conditions.

4. The method according to claim 3, wherein providing the at least one predetermined limit further includes providing the at least one predetermined limit based on data representative of the position of the servo track after the plurality of data cartridges are subjected to pack shifting conditions.

5. The method according to claim 1, wherein the at least one position is at least one of a distance of the servo track relative to a fixed point and slope of the servo track.

6. The method according to claim 1, wherein the at least one position includes a first position of the servo track at a first portion of the tape and a second position of the servo track at a second portion of the tape, and further wherein the detecting step includes detecting tape pack shift as a function of the difference between the first and second positions.

7. A method for retensioning a tape pack of a two-hub, belt-driven data cartridge, the tape pack including tape having one or more tracks, the method comprising the steps of:
   inserting the data cartridge into a tape drive, the tape pack at a parked position in the tape drive upon insertion;
   sensing at least one position of a track of the tape within the data cartridge when the tape is moved from the parked position;
   detecting tape pack shift of the tape pack as a function of the at least one sensed track position; and
   retensioning the tape pack upon detection of tape pack shift determined as a function of the at least one sensed track position, wherein retensioning the tape pack includes cycling through the tape and back to the parked position.

8. The method according to claim 7, wherein the track includes a servo track, and further wherein the sensing step includes sensing a position of the servo track within the data cartridge.

9. The method according to claim 8, wherein the sensing step includes sensing a position of a servo track relative to a base plate of the data cartridge.

10. The method according to claim 7, wherein the track includes a data track and the sensing step includes sensing a position of the data track within the data cartridge.

11. The method according to claim 7, wherein the sensing step includes sensing a first position of the track at a first portion of the tape and a second position of the track at a second portion of the tape.

12. The method according to claim 11, wherein the retensioning step includes retensioning the tape pack as a function of the difference between the first and second positions.

13. The method according to claim 12, wherein the first position of the track at the first portion of the tape is sensed as the tape is moved in a first direction, and the second position of the track at the second portion of the tape is sensed as the tape is moved in a direction opposite the first direction.

14. The method according to claim 11, wherein the retensioning step includes determining the slope of the track as a function of the first and second position and retensioning the tape pack as a function of the slope of the track.

15. The method according to claim 7, wherein the tape pack is parked at one of BOT, centrally, or at any other position between BOT and EOT prior to movement of the tape for sensing of the at least one position of the track.

16. The method according to claim 7, wherein the sensing step includes the steps of:
   moving a head assembly to lock onto the track; and
   sensing a position of the track based on the state of the head assembly.

17. The method according to claim 7, wherein the retensioning step includes the steps of:

providing at least one predetermined limit;

comparing the at least one sensed track position to the at least one predetermined limit; and retensioning the tape pack based on the comparison.

18. The method according to claim 17, wherein providing the at least one predetermined limit includes providing the at least one predetermined limit based on data representative of variation in the position of the track of a plurality of data cartridges before being subjected to pack shifting conditions.

19. The method according to claim 18, wherein providing the at least one predetermined limit further includes providing the at least one predetermined limit based on data representative of the position of the track after the plurality of data cartridges are subjected to pack shifting conditions.

20. The method according to claim 7, wherein information is one of magnetically written to and read from the tape.

21. The method according to claim 7, wherein the sensing step is performed during an initial load period at which time the tape is moved towards the end of the tape from a parked position of the tape, and further wherein the retensioning step is performed as a function of the position of the track without return to the parked position.

22. An apparatus for retensioning a tape pack of a two-hub, belt-driven data cartridge, the tape pack including tape having one or more tracks, the apparatus comprising:

a head assembly of a tape drive, the tape drive for receiving a data cartridge with the tape pack of the data cartridge at a parked position, the head assembly for sensing at least one position of a track of the tape within the data cartridge and for generating at least one position signal as a function of the position of the track when the tape is moved from the parked position; and a controller for receiving the at least one position signal and initiating retensioning of the tape pack as a function of the at least one position signal and at least one predetermined limit, wherein retensioning the tape pack includes cycling through the tape and back to the parked position.

23. The apparatus according to claim 22, wherein the track is one of a servo track and a data track.

24. The apparatus according to claim 22, wherein the head assembly includes at least one actuator for moving at least one head to lock onto the track, and further wherein the at least one position signal is based on the state of the at least one actuator.

25. The apparatus according to claim 22, wherein the at least one predetermined limit is a predetermined limit representative of variations in the position of the track of a plurality of data cartridges before being subjected to pack shifting conditions.

26. The apparatus according to claim 25, wherein the predetermined limit is further representative of the position of the track after the plurality of data cartridges are subjected to pack shifting conditions.

27. The apparatus according to claim 22, wherein the controller includes means for comparing the at least one position signal to the at least one predetermined limit during an initial load period as the tape is moved from a parked position of the tape pack and for initiating retensioning of the tape pack as a function of the comparison without return to the parked position.

28. The apparatus according to claim 22, wherein the tape includes at least one servo track, and further wherein the head assembly includes a head and an actuator for adjusting the position of the head, the head assembly for generating a position signal based on the position of the servo track, and further wherein the controller initiates retensioning of the tape pack as a function of the position signal and the at least one predetermined limit.

29. The apparatus according to claim 22, wherein the head assembly includes means for sensing a first position of the track at a first portion of the tape and sensing a second position of the track at a second portion of the tape, and further wherein the controller includes means for determining slope of the track as a function of the first and second position and initiating retensioning of the tape pack as a function of the slope and at least one predetermined slope limit.

30. The apparatus according to claim 22, wherein the head assembly includes means for sensing a first position of the track at a first portion of the tape as the tape is moved in a first direction and sensing a second position of the track at a second portion of the tape as the tape is moved in a direction opposite the first direction, and further wherein the controller includes means for retensioning the tape pack as a function of a difference between the first and second positions and the at least one predetermined limit.

31. The apparatus according to claim 22, wherein the tape pack is parked at one of BOT, centrally, or at any other position between BOT and EOT prior to movement of the tape for sensing the at least one position of the track.

\* \* \* \* \*